United States Patent [19]
Williams et al.

[11] 3,771,215
[45] Nov. 13, 1973

[54] FLASH WELDING METHOD

[75] Inventors: Arthur L. Williams, Warren; Robert S. Ellis, Canfield, both of Ohio

[73] Assignee: Wean United Inc., Youngstown, Ohio

[22] Filed: Mar. 30, 1972

[21] Appl. No.: 239,588

[52] U.S. Cl............... 29/482, 29/484, 29/493, 219/97, 228/4, 228/5
[51] Int. Cl............................................. B23k 31/02
[58] Field of Search ................... 228/4, 5, 6.5, 44; 219/97, 101; 29/482, 484, 473

[56] References Cited
UNITED STATES PATENTS

| | | | |
|---|---|---|---|
| 2,758,184 | 8/1956 | Seeloff et al. | 219/4 |
| 3,198,931 | 8/1965 | Klempay | 219/124 |
| 3,257,060 | 6/1966 | Williams et al. | 228/4 |
| 3,286,342 | 11/1966 | Seeloff et al. | 228/32 X |

*Primary Examiner*—Robert D. Baldwin
*Assistant Examiner*—Robert J. Craig
*Attorney*—Michael Williams

[57] ABSTRACT

Apparatus for and method of flash welding the trailing and leading ends of elongated metal strip, particularly where the strip is in coil form. The flash welder may be of standard construction with the exception that a shear is built into the welder and disposed downstream of the welding clamps, and a strip indexing means is disposed downstream of the shear. Strip from one coil is fed through the welder without obstruction. When the supply on this coil is near exhaustion, further movement of the strip is arrested and the shear is operated to sever the strip. The tail portion of the severed strip is withdrawn from the welder and when such portion clears the welding clamps, a gauge bar is disposed between the clamps while the main portion of the severed strip is moved in an upstream direction by the indexing means so that its sheared end abuts against one side of the gauge bar. Strip from the other coil is fed into the welder until its leading end abuts the opposite side of the gauge bar. The welding clamps are then closed on the strips, the gauge bar is withdrawn, and a normal flash welding operation takes place.

5 Claims, 6 Drawing Figures

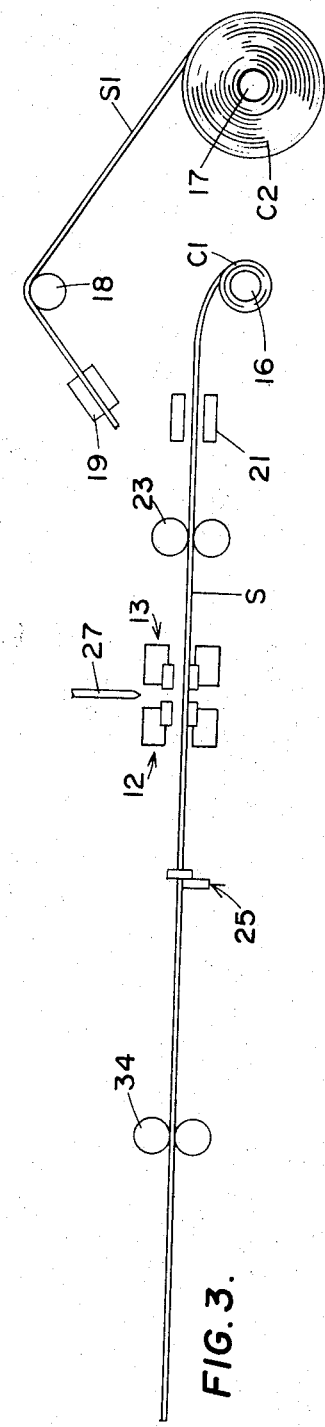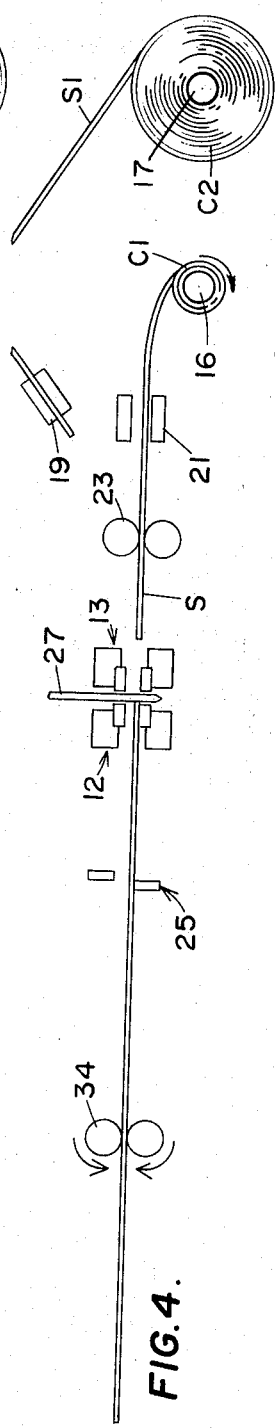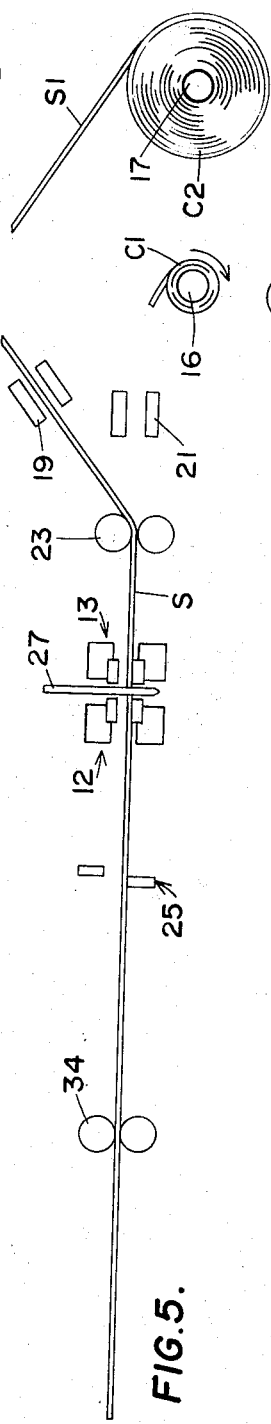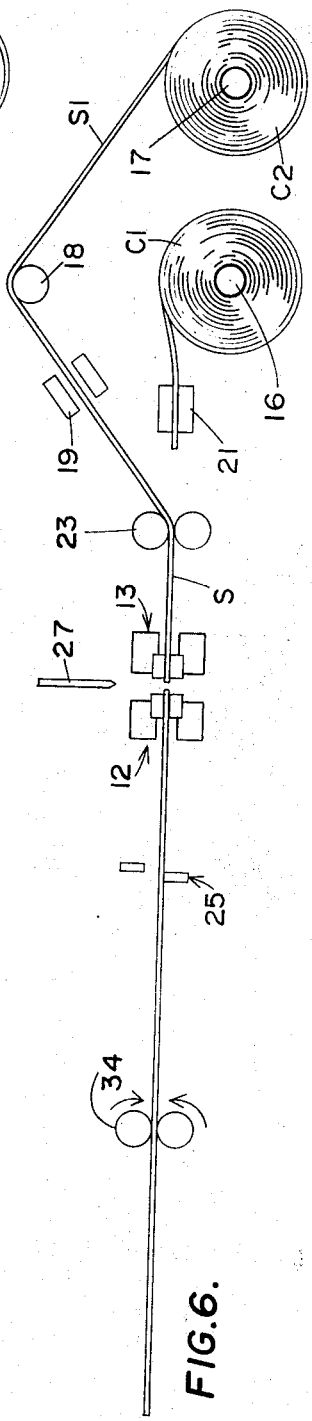

FLASH WELDING METHOD

BACKGROUND AND SUMMARY

In order for industry to combat rising costs, greater emphasis is being placed on increased productivity. In a continuous steel mill line operation, speed of the steel strip advancing along the line has been increased, but a limiting factor has been the welding of the trailing end of strip from one coil to the leading end of strip from another coil.

Our invention reduces time limitations involved in the use of standard flash welders for joining strip from coil to coil, without materially changing standard flash welder design. Briefly, a shear is built into the flash-welder and positioned downstream of the welding clamps. When the strip supply from one coil is near exhaustion, movement of such strip is halted and an indexing device downstream of the shear grasps the strip while the shear severs it transversely. The tail end of the severed strip is withdrawn from the welder, and when such tail end clears the welding clamps, the grasped portion of the strip is moved upstream to abutment with one side of a gauge bar, while the leading end of strip from another coil is fed into the welder to abutment the opposite side of the gauge bar. The welding clamps are then closed on the strips, the gauge bar withdrawn, and normal flash welding takes place.

DESCRIPTION OF THE DRAWINGS

In the drawings accompanying this description and forming a part of this specification, thereare shown, for purposes of illustration, several embodiments which our invention may assume, and in these drawings.

DESCRIPTION OF THE PREFERRED EMBODIMENT

Figure 1:
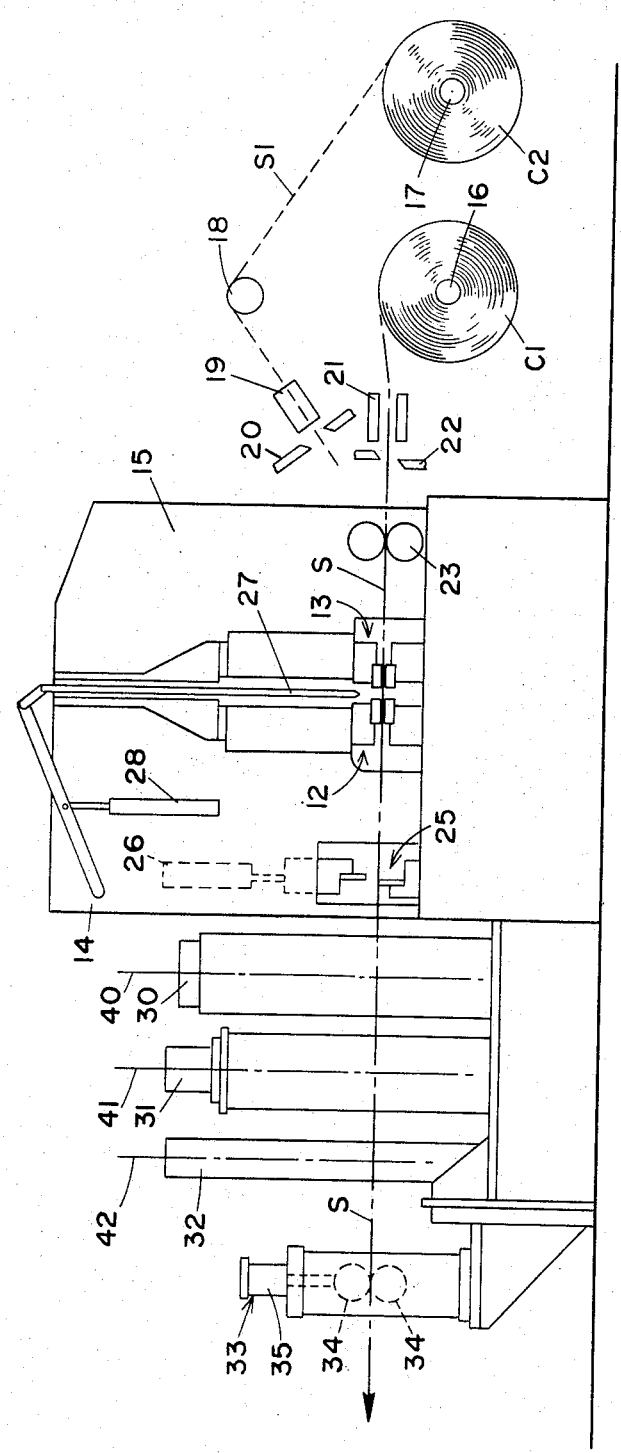
FIG. 1 is a side view of a flash welder embodying our invention, parts being broken away and parts fragmentarily shown.

The flash welder shown in FIG. 1 may take the form shown in U.S. Pat. No. 3,003,052, which is assigned to the assignee of the present application. The welder comprises pairs of strip clamping jaws 12 and 13 which extend transversely of the strip S (shown in dot-dash lines). Each jaw pair comprises relatively movable upper and lower jaws which may be closed on the strip by suitable fluid cylinders. The jaw pair 12 is carried by a stationary part 14 of the welder frame, while the jaw pair 13 is carried by a movable part 15 of the welder frame. In accordance with standard design, the frame part 15 is moved toward and away from the stationary part by a suitable fluid cylinder, and thus provides corresponding movement of the jaw pairs 12 and 13 for the flash welding operation.

The strip S is fed from a coil C1 which is mounted on a standard uncoiler 16 driven by a reversible motor. A second coil C2 is disposed adjacent the coil C1 in a manner shown in patent 3 256 419 which is also assigned to the assignee of the present application. The coil C2 is mounted on a similar standard uncoiler 17 which is driven by a reversible motor. The strip S1 (shown in dash lines) from the coil C2 is fed over an idler roll 18 and its leading end is held by clamps 19 in stand-by position relative to the welder. An entry shear 20 may be disposed adjacent to the clamps 19 and is operable to crop the leading end of the strip from coil C2 so that such end is ready for the welding operation. Similar clamps 21 are disposed for cooperation with the leading end of the strip S together with an entry cropping shear 22.

Strip S moves through the open clamps 21 and shear 22 and through a pair of rolls 23 which position it along the pass line of the welder. In the present case the rolls 23 are merely idler rolls, although these rolls may be driven by a reversible motor, in which case the uncoilers 16 and 17 need not be driven.

A built-in shear 25 is supported by the stationary frame part 14 in position downstream of the pairs of welding jaws 12, 13. A fluid cylinder 26 is connected to the movable blade of the shear and is operable to cause the shear to transversely sever the strip.

A gauge bar 27 is carried by the stationary part 14 of the welder frame and may take the form shown in U.S. Pat. No. 3,257,060, also assigned to the assignee of the present invention. A fluid cylinder 28 is operable to move the gauge bar 27 vertically, so that at a predetermined time its lower end may be disposed betwen the pairs of welding jaws 12, 13.

If desired, strip trimming and notching devices 30, 31 may be supported by the bed of the welder, downstream of the shear 25. The trimming device 30 may correspond to the construction shown in FIG. 2 of U.S. Pat. No. 3,003,052, and generally it comprises means for trimming weld proturberances which project from the opposite flat sides of the strip at the weld joint. The notching device 31 may correspond to the construction shown in FIG. 3 of U.S. Pat. No. 3,003,052, and generally it comprises means for trimming weld proturberances which project from opposite side edges of the strip at the weld joint.

Further, if desired, an annealing device 32 may be positioned downstream of the notching and may comprise any suitable means for annealing the weld area. Although the trimming, notching and annealing devices are not essential insofar as the invention is concerned, they are included in the interest of disclosing a complete system of welding and treating the weld area.

A strip indexing means 33 is disposed downstream of the welding jaws and in the disclosed embodiment, such means is downstream of and adjacent to the annealing device 32. In FIG. 1, the indexing means is shown in the form of a pinch roll stand which is secured to or positioned adjacent the left hand end of the table which supports the annealing device 32 and other parts of the welder. The stand comprises a pair of pinch rolls 34, the upper one of which is forced toward the lower one by a fluid cylinder 35 to pinch the strip S therebetween. One or both of the rolls 34 may be driven in a measured-type roll rotation, in accordance with known practice, to effect accurate dis-position of the strip along the pass line.

In FIG. 1, it is assumed that the strip S is moving freely through the welder, cooperating devices and pinch roll stand, and along the pass line to strip processing mechanism, not shown, but located to the left of FIG. 1. The strip may be fed along the pass line by either the uncoiler 16, or the driven pinch rolls 23, or by some means acting in conjunction with the strip processing mechanism, or a combination of these strip moving means.

When the supply of strip on the coil C1 nears exhaustion, movement of the strip S is halted in any suitable manner. This may be accomplished manually by the operator following visual observation of the dwindling supply of strip on the coil, or it may be accomplished automatically by means of a limit switch which is responsive to the decrease in diameter of the strip on the coil C1.

Substantially with the halting of strip movement, the pinch rolls 34,34 of the indexing means 33 are engaged on the strip, as seen in FIG. 3, to grasp the same and hold it against movement. To engage the rolls on the strip, a valve controlling fluid flow to the cylinder 35 may be actuated by the same means that causes halting of the strip movement.

By means of a suitable time delay, the fluid cylinder 26 is operated to cause the shear 25 to go through a cutting cycle and then return to its inoperative position. Operation of the shear 25 will transversely sever the strip S into two portions, the main portion being downstream of the shear and grasped by the rolls 34,34 of the indexing device 33, and the tail being upstream of the shear and integral with the small amount of strip remaining on the coil C1.

Immediately after the strip S has been severed by the shear, the tail portion is started to be withdrawn from the welder, either by reversal of the motor for the uncoiler 16, or by reversal of rotation of the pinch rolls 23, and this may be effected by an electrical control which is activated at the time the shear has completed the cut and returned to inoperative position. When the withdrawing tail portion has cleared the welding jaws or clamps 12, 13, as seen in FIG. 4, the fluid cylinder 28 is activated to dispose the lower end of the gauge bar 27 between the pairs of welding jaws. Activation of the cylinder 28 may be effected by a valve which is electrically energized by a limit switch or electric eye responsive to the position of the strip tail end when it clears the welding jaws.

At about the same time the tail end of the strip is starting its withdrawal movement, the drive to the pinch rolls 34,34 is activated to cause rotation of the rolls in the direction of the arrows shown in FIG. 4. This drive may be effected by a control which receives a signal from the strip withdrawing means. Rotation of the pinch rolls 34,34 will move the main strip portion upstream until the sheared end of this portion abuts against the facing side of the gauge bar, and further movement in this direction will then be halted, such as by a revolution counter on the rolls 34,34, or by a limit switch in the path of movement of the sheared end. The pinch rolls 34,34 of the indexing means 33 remain clamped on the main portion of the strip S.

After the tail portion of the strip has cleared the rolls 23, the motor for the uncoiler 17 is energized, and thus may be accomplished by a limit switch which is tripped as the sheared end of the tail portion moves to the right of the rolls 23. Simultaneously with the energization of the uncoiler motor 17, the clamps 19 are opened and the strip S1 is fed to the rolls 23, a suitable guide (not shown) being utilized to properly direct the end of this strip to pass between the rolls. The strip S1 is fed into the welder until its cropped end abuts the opposite side of the gauge bar 27, and is then halted in any suitable manner, such as by activation of a limit switch.

With the strip ends abutting opposite sides of the gauge bar, the cylinders for the welding jaws 12,13 are activated to close the jaws on such strip ends, and the cylinder 20 is then activated to withdraw the gauge bar end from between the welding jaws, as shown in FIG. 6. The welding jaw cylinders may be actuated by limit switches activated when both strip ends have abutted the gauge bar 27. When the welding jaws are firmly clamped on the strip ends, a signal is given to the welder control to cause it to perform a normal welding operation to join the strip ends. Such signal may result from pressure switches responsive to the pressure built up in the clamping cylinders.

During the time the foregoing sequence is taking place, a new coil of steel may be disposed on the uncoiler 16, with its leading end cropped by the shear 22 and held by the clamps 21, as seen in FIG. 6, ready for use when the strip supply on the coil C2 nears exhaustion.

The pinch rolls 34,34 of the strip indexing means 33 have remained clamped on the main portion of strip S and when the weld has been completed, and the welding jaws opened, the pinch rolls 34,34 are immediately rotated in the direction of the arrows shown in FIG. 6 to move the welded strip downstream of the pass line. The motor for rotating the rolls 34 may be activated by a signal from the welder following the welding operation, such as a pressure switch responsive to the decrease in pressure in the welding jaw cylinders.

The first amount of rotation of the rolls 34,34 in the direction of the arrows in FIG. 6 will be a measured, predetermined amount, which may be controlled by a rotation counter, to move the welded strip downstream until its weld line is accurately aligned with the centerline 40 of the trimming device 30. When so aligned, and with the strip halted since it is still gripped by the now stationary rolls 34,34, the trimming knives of the device 30 will be caused to move across the upper and lower sides of the strip to trim weld protuberances therefrom.

After the trimming operation, the rolls 34,34 are again rotated a precise amount in the direction of the arrows shown in FIG. 6 to move the welded strip downstream to precisely align the weld line with the centerline 41 of the notching device 31, and the latter is then activated to trim weld flash from the opposite side edges of the halted strip. After edge trimming, the rolls 34,34 are again rotated a precise amount to accurately align the weld line with the center line 42 of the annealing devide 32, and the weld area is annealed.

After annealing, the cylinder 35 of the indexing means 33 is activated to open the rolls 34,34 and the strip is free to move from the coil C2 along the pass line, to the strip processing line.

DESCRIPTION OF OTHER EMBODIMENT

Figure 2:
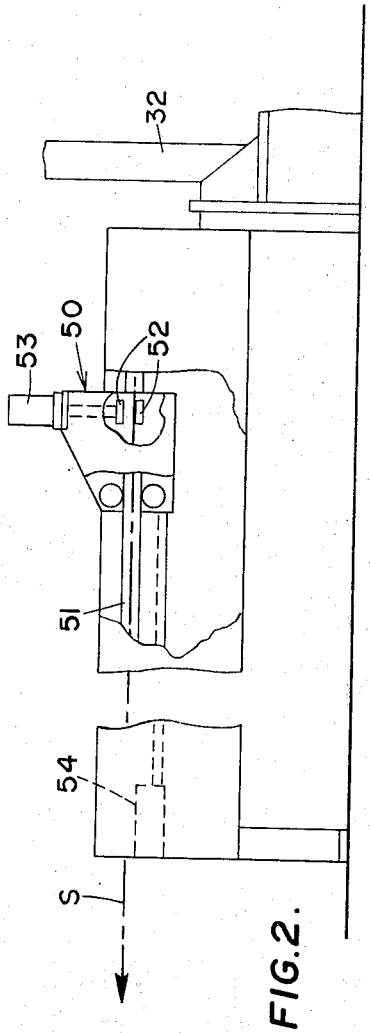
FIG. 2 is a fragmentary view of a different strip indexing means which may be used in the embodiment shown in FIG. 1, and FIGS. 3 through 6 are schematic views showing the position of parts during the various steps in the operation of the embodiment shown in FIG. 1.

Instead of the pinch roll stand 33 above described, a transfer carriage 50, shown in FIG. 2, may be employed to index the strip to the various positions. The transfer carriage is shown and described in U.S. Pat. No. 3 003 052, as is a control circuit for effecting its operation.

Briefly, the transfer carriage 50 is mounted for movement along rails 51 in a direction parallel with the movement of the strip along the passline of the welder. The carriage has a pair of clamps 52,52, the upper one of which is moved toward the lower one by a fluid cylinder 53 to clamp the strip therebetween.

FIG. 2 shows the transfer carriage in position, with clamps open, when the strip is moving freely along the pass line. When the supply of strip on coil C1 nears exhaustion, the clamps 52,52 are engaged on the strip. After the strip is cut transversely by the shear 25, the main portion of the strip is moved toward the welding clamps 12,13 by movement of the transfer carriage to the right, as by means of a fluid cylinder 54, until the sheared end of such strip abuts against the gauge bar 27. After welding, the transfer carriage moves to the left in precisely controlled amounts, to accurately align the weld line successively with the devices 30,31 and 32, for such devices to operate on the strip as before described, and thereafter the carriage clamps 52,52 are opened to permit free movement of the strip along the pass line. We claim:

1. The method of welding the trailing end of strip from a first coil to the leading end of strip from a second coil in a flash welder having the usual pairs of welding clamps, each pair being adapted to engage opposed surfaces of the ends of respective strips and the pairs of clamps being movable toward and away from each other, the welder also including a gauge bar movable between the pairs of clamps and having opposite sides against which strip ends are abutted for welding spacing, the welder also including a shear downstream of the welding clamps and indexing means downstream of said shear and adapted to engage strip from said first coil and move it toward and away from said welding clamps, the improved method comprising:

uncoiling strip from said first coil and feeding it along the pass line of the welder during the time said welding clamps, said shear and said indexing means permit free movement of the strip, arresting movement of the strip from said first coil when the supply on said first coil nears exhaustion, engaging said indexing means onto the strip from said first coil to hold the same against movement, operating said shear to transversely sever the strip from said first coil and then return to open position, whereby such strip is cut into two portions, one portion held stationary by said indexing means downstream of said shear and the other portion freely movable along said pass line, withdrawing said other strip portion through the pairs of welding clamps and out of said welder, moving said gauge bar, when said other strip portion has been withdrawn sufficiently to clear said welding clamps, to position between said pairs of clamps, operating said indexing means to move said one strip portion upstream until its sheared end abuts against the facing side of said gauge bar, moving the leading end of the strip from said second coil along said pass line until it abuts against the opposite side of said gauge bar, engaging respective pairs of welding clamps on the strips on opposite sides of said gauge bar, and withdrawing said gauge bar from position between said clamps and flash welding the strip ends that have been spaced by said gauge bar.

2. The method according to claim 1 and further including the step of cropping the leading end of the strip from said second coil prior to the time it is moved along said pass line, whereby to provide a sheared end for abutment with the opposite side of said gauge bar.

3. The method according to claim 1 wherein said indexing means is in the form of pinch rolls of the type having measured rotating operation.

4. The method according to claim 1 wherein said indexing means is in the form of a transfer table.

5. The method according to claim 1 and further including the step of rotating said first coil in a winding direction to withdraw said other strip portion through said pairs of welding clamps.

* * * * *